US009588508B2

(12) United States Patent
Sasaki (10) Patent No.: US 9,588,508 B2
(45) Date of Patent: Mar. 7, 2017

(54) MASTER DEVICE THAT CHANGES DATA COMMUNICATION SPEED IN ACCORDANCE WITH THE NUMBER OF SLAVE DEVICES

(71) Applicant: FANUC Corporation, Minamitsuru-gun, Yamanashi (JP)

(72) Inventor: Taku Sasaki, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 888 days.

(21) Appl. No.: 13/924,876

(22) Filed: Jun. 24, 2013

(65) Prior Publication Data
US 2013/0345837 A1    Dec. 26, 2013

(30) Foreign Application Priority Data
Jun. 26, 2012  (JP) .................................. 2012-143457

(51) Int. Cl.
G05B 19/18     (2006.01)
G05B 19/042    (2006.01)

(52) U.S. Cl.
CPC ........... *G05B 19/18* (2013.01); *G05B 19/042* (2013.01); *G05B 2219/25103* (2013.01); *G05B 2219/33125* (2013.01); *Y02P 90/185* (2015.11)

(58) Field of Classification Search
CPC .............................. G05B 19/18; G05B 19/042
See application file for complete search history.

(56) References Cited

U.S. PATENT DOCUMENTS

| 6,188,190 | B1* | 2/2001 | Arakawa | .................... | H02P 5/00 |
| | | | | | 318/560 |
| 2004/0160206 | A1* | 8/2004 | Komaki | ............... | G05B 19/408 |
| | | | | | 318/569 |
| 2009/0066282 | A1* | 3/2009 | Worrall | ................. | H02M 7/003 |
| | | | | | 318/441 |
| 2012/0013284 | A1* | 1/2012 | Campbell | ................ | H02H 7/08 |
| | | | | | 318/490 |
| 2012/0049779 | A1* | 3/2012 | Kawajiri | ................. | H02P 23/22 |
| | | | | | 318/611 |

FOREIGN PATENT DOCUMENTS

| CN | 1860715 A | 11/2006 |
| CN | 102420736 A | 4/2012 |
| JP | 2005-260384 A | 9/2005 |
| JP | 2008-242728 A | 10/2008 |

* cited by examiner

Primary Examiner — Gary Mui
Assistant Examiner — Stephen Steiner
(74) Attorney, Agent, or Firm — Drinker Biddle & Reath LLP (57) ABSTRACT

A call unit transmits a call signal to verify the presence or absence of slave devices, which correspond to motors, to all of the slave devices after a master device is activated. A response reception unit determines the number of the slave devices, based on the number of response signals to the call signals. A communication speed change determination unit determines whether or not a data communication speed between the master device and the slave devices should be changed from a first speed to a second speed different from the first speed during a period from the time when the number of the slave devices is determined to the time when the drive of the motors is stopped, in accordance with a result of comparison of between the number of the slave devices and a predetermined number.

5 Claims, 3 Drawing Sheets

MASTER DEVICE THAT CHANGES DATA COMMUNICATION SPEED IN ACCORDANCE WITH THE NUMBER OF SLAVE DEVICES

RELATED APPLICATION DATA

This application claims priority under 35 U.S.C. §119 and/or §365 to Japanese Application No. 2012-143457 filed Jun. 26, 2012, the entire contents of which is incorporated herein by reference.

BACKGROUND OF THE INVENTION

1. Field of the Invention

The present invention relates to a master device capable of connecting to slave devices, which correspond to a plurality of motors, via a serial communication bus for carrying out data transmission and reception, in order to control a system in which motors of the same number as inverters can be connected in parallel to a DC link part, which is connected to an alternating-current power source via a converter, via each of the inverters.

2. Description of Related Art

A master device that is connected to a slave device via a serial communication bus for carrying out data transmission and reception in order to control a motor in a system, which includes motors for driving a feed axis and a main axis of a machine tool, an industrial robot arm, etc., is proposed in, for example, Japanese Unexamined Patent Publication (Kokai) No. 2008-242728 (JP2008-242728A).

In such a system which includes the motors, the master device is comprised of a converter control device configured to control a converter in order to convert alternating-current power supplied from an alternating-current power source into direct-current power, an upper control device such as a CNC (computer numerical control), etc., and the slave device is implemented by an inverter control device configured to control an inverter in order to convert the direct-current power which is converted by a converter into alternating-current power, etc. For example, in the case where the master device is the converter control device and the slave device is the inverter control device, data such as motor status information, alarm information, etc., is shared between the converter control device and the inverter control device by carrying out data transmission and reception via a serial communication bus. In the case where the master device is the upper control device and the slave device is the inverter control device, data such as motor position or speed command data, etc., is transmitted from the upper control device to the inverter control device via the serial communication bus and data such as current value data, motor position or speed data, etc., is transmitted from the inverter control device to the upper control device via the serial communication bus, thereby the data is shared between the converter control device and the inverter control device.

A serial communication among a plurality of devices can transmit and receive an amount of data larger than the amount of data that can be transmitted and received by parallel communication with electric lines in a number smaller than the number of electric lines used for the parallel communication (for example, two electric lines are used in the case of RS422 serial communication).

In the serial communication, if it is desired to increase the amount of data to be transmitted and received per unit time, and therefore it is necessary to increase the data communication speed, i.e., extend the bandwidth of a signal necessary to transmit data. In the case where the bandwidth of the signal necessary to transmit data is extended, it is also necessary to extend the bandwidth of a filter provided in at least one of the master device and the slave device in order to remove noise received in the serial communication. Therefore, as the bandwidth of the filter is extended, the influence of noise received in the serial communication increases.

Measures against the noise received in the serial communication are taken in order to extend the bandwidth of the signal necessary to transmit data and to maintain the serial communication with high reliability. As measures against the noise received in the serial communication, there are an increase in the thickness of the cable used for the serial communication in accordance with an increase of the data communication speed in order to reduce an impedance of the cable used for the serial communication, an increase in the thickness of the shield for the cable used for the serial communication in accordance with an increase in the data communication speed in order to prevent fluctuations in the electric potential due to an external influence, a reduction of the length of the cable used for the serial communication in accordance with an increase in the data communication speed in order to reduce the impedance of the cable used for the serial communication, etc.

Consequently, the cost necessary to take such measures against the noise received in the serial communication and restrictions on the length of the cable used for the serial communication increase as the data communication speed increases.

In the above-mentioned system which includes the motors, in order to keep the period necessary to periodically carry out necessary data transmission and reception between the master device and a plurality of the slave devices via the serial communication bus during the period from the start of the drive of the motor to the stop of the drive of the motor (data transmission and reception period) at a fixed time (for example, 1 msec) or less, it is necessary to increase the data communication speed of data transmitted and received between the master device and a plurality of the slave devices as the number of slave devices, which correspond to the motors actually connected to the DC link part, increases.

In the above-mentioned conventional system which includes the motors, in order to keep the above-mentioned data transmission and reception period at a fixed time or less, the communication speed of data transmitted and received between the master device and a plurality of the slave devices via the serial communication bus is set to a fixed communication speed regardless of the number of slave devices, which correspond to the motors actually connected to the DC link part.

In the case where the communication speed of data transmitted and received between the master device and a plurality of the slave devices via the serial communication bus is set to a speed more than necessary, the cost necessary to take measures against the noise received in the serial communication and restrictions on the length of the cable used for the serial communication increase more than necessary.

For example, in a system in which the number of slave devices, which correspond to the maximum number of motors that can be connected to the DC link part, is ten, a case where the data communication speed is set to 500 kHz in order to keep the above-mentioned data transmission and reception period for carrying out data transmission and reception between the master device and ten slave devices at 1 msec, is envisaged.

In this case, even when the number of slave devices, which correspond to the motors in a number less than the maximum number (ten, in this case) actually connected to the DC link part, is five, the data communication speed is 500 kHz, and therefore, the above-mentioned data transmission and reception period when the number of slave devices is five is 0.5 msec. That is, in order to keep the data transmission and reception period at 1 msec when the number of slave devices is five, it is sufficient to set the data communication speed to 250 kHz.

Consequently, the communication speed is higher than the data communication speed necessary to keep the data transmission and reception speed at 1 msec, and therefore, the cost necessary to take such measures against the noise received in serial communication and the restrictions on the length of the cable used for the serial communication increase more than necessary.

On the other hand, in the case where the number (for example, five) of slave devices, which correspond to the motors in a number less than the maximum number (in this case, ten) actually connected to the DC link part, is supposed and the data communication speed is set to low so that the cost necessary to take measures against the noise received in serial communication and the restrictions on the length of the cable used for the serial communication do not increase, it is no longer possible to maintain the necessary data transmission and reception period.

For example, in a system in which the number of slave devices, which correspond to the maximum number of motors that can be connected to the DC link part, is ten, the number of slave devices, which correspond to the motors in a number less than the maximum number (in this case, ten) actually connected to the DC link part, is supposed to be five, and the case where the data communication speed is set to 500 kHz in order to keep the above-mentioned data transmission and reception period for carrying out the data transmission and reception between the master device and the five slave devices at 1 msec.

In this case, even when the number of slave devices, which correspond to the maximum number (in this case, ten) of motors actually connected to the DC link part, is ten, the data communication speed is 500 kHz, and therefore, the above-mentioned data transmission and reception period when the number of slave devices is ten will be 2 msec. As described above, in the case where the slave devices in a number (in this case, ten which is the maximum number) exceeding the number of slave devices used, it is no longer possible to maintain the necessary data transmission reception period (1 msec).

SUMMARY OF THE INVENTION

As an aspect, the present invention provides a master device capable of maintaining a necessary data transmission and reception period in order to carry out data transmission and reception with a slave device via the serial communication without increasing the cost necessary to take measures against the noise received in serial communication and the restrictions on the length of the cable used for serial communication more than necessary.

According to an aspect of the present invention, the master device capable of connecting to slave devices, which correspond to a first number not less than two of motors, via a serial communication bus for carrying out data transmission and reception at a first communication speed, in order to control a system in which a first number not less than two of motors in the same number as the number of inverters can be connected in parallel to a DC link part, which is connected to an alternating-current power source via a converter, via each the first number of the inverters, the number of the slave devices being a second number, has: a call unit configured to transmit a call signal to verify the presence or absence of the slave devices, which correspond to the motors, to all of the slave devices, which correspond to all of the motors connected to the DC link part, after the master device is activated; a response reception unit configured to receive a response signal to the call signal from each of the slave devices, which correspond to all of the motors connected to the DC link part, and to determine a third number which is the number of all the slave devices, which correspond to all of the motors connected to the DC link part, based on the number of received response signals; and a communication speed change determination unit configured to determine whether or not a data communication speed of the data transmitted and received between the master device and the third number of slave devices should be changed from the first communication speed to a second communication speed different from the first s communication peed during a period from the time when the third number is determined to the time when the drive of the motors is stopped, in accordance with a result of comparison of between the third number and a fourth number less than the second number and equal to or more than one.

Preferably, the master device further has a change notification unit configured to notify the change of the data communication speed from the first communication speed to the second communication speed to the third number of the slave devices, the second communication speed is lower than the first communication speed, and the communication speed change determination unit changes the data communication speed of the data transmitted and received between the master device and the third number of slave devices from the first communication speed to the second communication speed during a period from the time when the third number is determined to the time when the drive of the motors is stopped if the third number is equal to or less than the fourth number.

Preferably, the master device further has a bandwidth change unit configured to change a bandwidth of a band variable filter provided in at least one of the master device and the third number of the slave devices from a first bandwidth to a second bandwidth narrower than the first bandwidth in order to remove noise received in the serial communication, in accordance with the change of the data communication speed from the first communication speed to the second communication speed.

Preferably, the master device further has a change notification unit configured to notify the change of the data communication speed from the first communication speed to the second communication speed to the third number of the slave devices, the second communication speed is higher than the first communication speed, and the communication speed change determination unit changes the data communication speed of data transmitted and received between the master device and the third number of the slave devices from the first communication speed to the second communication speed during a period from the time when the third number is determined to the time when the drive of the motors is stopped if the third number is larger than the fourth number.

Preferably, the master device further has a bandwidth change unit configured to change a bandwidth of a band variable filter provided in at least one of the master device and the third number of the slave devices from a first bandwidth to a second bandwidth greater than the first bandwidth in order to remove noise received in the serial communication, in accordance with the change of the data communication speed from the first communication speed to the second communication speed.

According to the master device in an aspect of the present invention, it is possible to provide a master device capable of maintaining a necessary data transmission and reception period in order to carry out data transmission and reception with a slave device via the serial communication without increasing the cost necessary to take measures against the noise received in serial communication and the restrictions on the length of the cable used for serial communication more than necessary.

BRIEF DESCRIPTION OF THE DRAWINGS

The objects, features, and advantages of the present invention will be clear based on the descriptions in the following embodiments relating to the accompanying drawings. In the drawings.

DETAILED DESCRIPTION

Embodiments of the master device according to the present invention are explained with reference to the drawings. In the drawings, the same symbols are attached to the same components.

Figure 1:
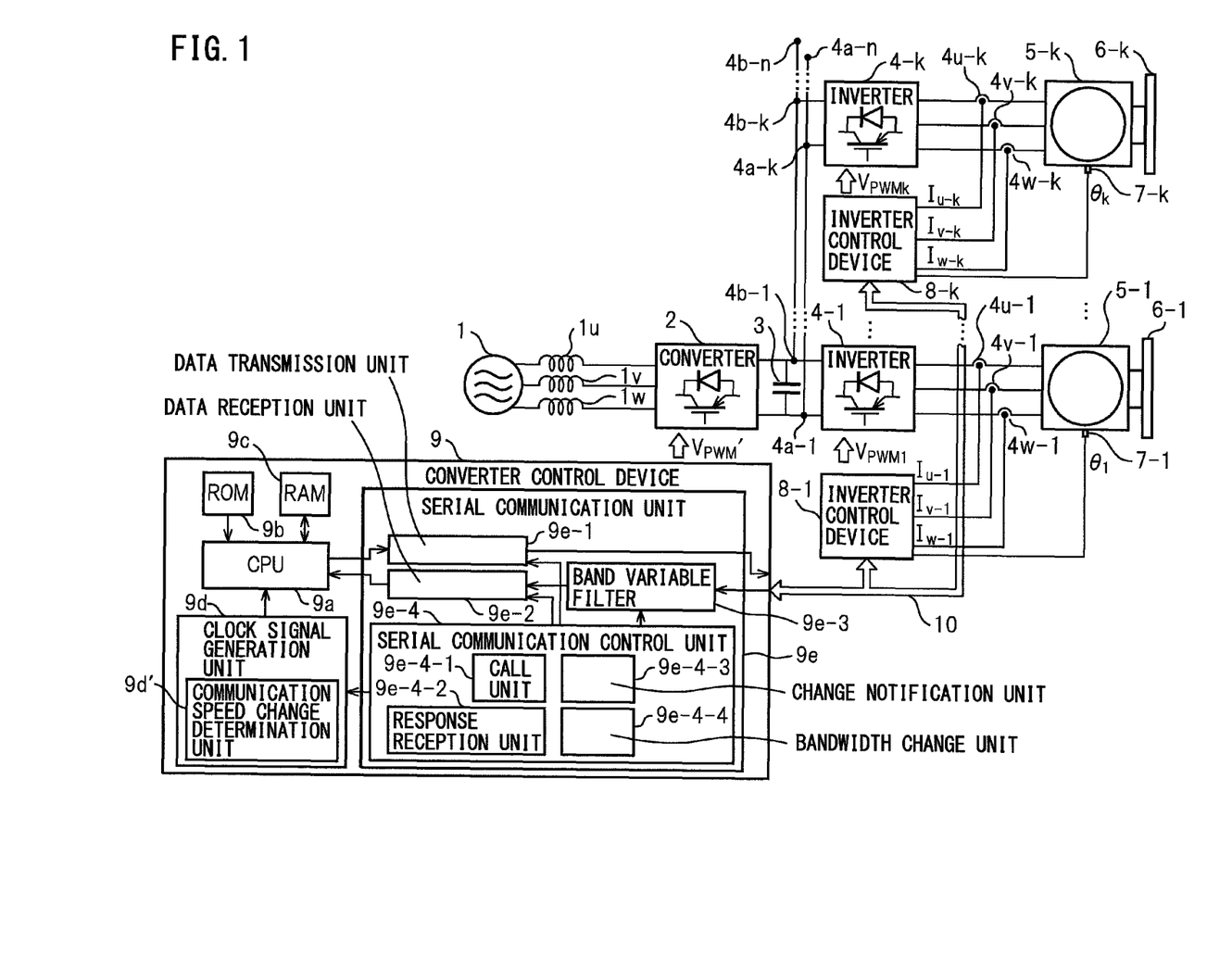
FIG. 1 is a block diagram of a system to which a master device according to the present invention is applied in order to control motors.

Referring to the drawings, FIG. 1 is a block diagram of a system to which the master device according to the present invention is applied in order to control motors. The system shown in FIG. 1 is used in a machine tool and has a three-phase alternating-current power source 1 as an alternating-current power source, a converter 2, a smoothing capacitor 3 as a DC link part, the number k (k is equal to 0 or an integer not less than 1) of inverters 4-1, . . . , 4-k, the number k of motors 5-1, . . . , 5-k, the number k of driven objects 6-1, . . . , 6-k, the number k of rotation angle detection units 7-1, . . . , 7-k, the number k of inverter control devices 8-1, . . . , 8-k as a slave device, and a converter control device 9 as a master device.

In the system shown in FIG. 1, it is possible to connect the number n (n is an integer not less than 2 and not more than k) as the first number of motors in parallel to the smoothing capacitor 3 via each of the number n of inverters, which are connected to each of the number n of connection parts 4a-1; 4b-1, . . . , 4a-k; 4b-k, . . . , 4a-n; 4b-n. That is, n is the number of inverters, which correspond to the maximum number of the motors that can be connected to the smoothing capacitor 3. Due to this, the converter control device 9 can connect to the number n as the second number of inverter control devices, which correspond to the number n of the motors, via a serial communication bus 10 (for example, RS422 serial communication bus) for carrying out data transmission and reception of data, such as motor status information, alarm information, etc., at a first communication speed f1 (for example, 500 kHz), which is set so that the data transmission and reception period can be kept at a fixed time (for example, 1 msec) or less even if the number n of inverter control devices, that is, the maximum number of inverter control devices which can be used, are used. Consequently, the first communication speed f is set so as to increase as n increases, i.e., as the length of the serial communication bus 10 interposed between the converter control device 9 and the inverter control device 8-k most distant from the converter control device 9 becomes longer.

The system shown in FIG. 1 has the number n, which is the maximum number (i.e., n=k), of inverter control devices in order to constitute a large scale system, which is an application with ultrahigh functions, however, the system shown in FIG. 1 generally has the number k less than the maximum number n (i.e., n>k) of inverter control devices in order to constitute a medium scale or small scale system.

In the system shown in FIG. 1, if n>k, it is preferable to arrange the inverter control devices 8-1, . . . , 8-k so that the length of the serial communication bus 10 interposed between the converter control device 9 and the inverter control device 8-k most distant from the converter control device 9 is the minimum in order to reduce the scale of the system as much as possible. That is, it is preferable to connect the inverter 4-j (j is an integer not less than one and not more than k), which is the j-th inverter counting from the inverter nearest to the converter control device 9, to the connection part 4a-j; 4b-j, which is the j-th connection part counting from the connection part nearest to the converter control device 9.

However, if n>k, the difference between the data transmission and reception period when the inverter control devices 8-1, . . . , 8-k are arranged so that the length of the serial communication bus 10 becomes the maximum, and the data transmission and reception period when the inverter control devices 8-1, . . . , 8-k are arranged so that the length of the serial communication bus 10 is the minimum, is substantially zero. Consequently, it is not necessary to arrange the inverter control devices 8-1, . . . , 8-k so that the length of the serial communication bus 10 becomes the minimum.

The converter 2 consists of a plurality (six, in the case of three-phase alternating current) of rectifier diodes and transistors connected in inverse parallel to the rectifier diodes, respectively, for example, and converts alternating-current power supplied from the three-phase alternating-current power source 1 into direct-current power. The smoothing capacitor 3 is connected in parallel to the converter 2 in order to smooth a voltage rectified by the rectifier diode of the converter 2. Each of the inverters 4-1, . . . , 4-k is connected in parallel to the smoothing capacitor 3, consists of a plurality (six, in the case of three-phase alternating current) of rectifier diodes and transistors connected in inverse parallel to the rectifier diodes, respectively, for example, and converts the direct-current power into which converted by the converter 2 into alternating-current power by turning on and off the transistor based on PWM signals $V_{PWM1}, \ldots, V_{PWMk}$, to be explained later.

The motors 5-1, . . . , 5-k are driven by power stored in the smoothing capacitor 3. As the motors 5-1, . . . , 5-k, a gravity axis servo motor configured to drive the main axis of a machine tool in the gravity axis direction (Z-axis direction) by a feed screw mechanism, such as a ball screw and nut mechanism, a main axis motor configured to drive a tool attached to the main axis of a machine tool, a horizontal axis servo motor configured to drive a table of a machine tool to which a work is attached in the horizontal axis direction (for example, X-axis direction) by a feed screw mechanism, such as a ball screw and nut mechanism, etc., is used.

The driven objects 6-1, . . . , 6-k are driven by the motors 5-1, . . . , 5-k, respectively. For example, in the case where k=3 and the motors 5-1, . . . , 5-*k* are the gravity axis motor, the main axis motor, and the horizontal axis servo motor, respectively, the driven objects 6-1, . . . , 6-*k* are the main axis of the machine, the tool, and the table of the machine tool.

The rotation angle detection units 7-1, . . . , 7-*k* consist of rotary encoders configured to detect rotation angles $\theta_1, \ldots, \theta_k$ of the motors 5-1, . . . , 5-*k* as the positions or speeds of the motors, respectively.

The inverter control devices 8-1, . . . , 8-*k* sample current values of three phases of U-phase currents $I_{U-1}, \ldots, I_{U-k}$, V-phase currents $I_{V-1}, \ldots, I_{V-k}$, and W-phase currents $I_{W-1}, \ldots, I_{W-k}$, respectively, detected by current detection units 4*u*-1; 4*v*-1; 4*w*-1, . . . , 4*u*-*k*; 4*v*-*k*; 4*w*-*k* provided in the output lines of the inverters 4-1, . . . , 4-*k*, respectively, as current value data of the motors 5-1, . . . , 5-*k*, respectively, and sample the rotation angles $\theta_1, \ldots, \theta_n$, respectively, as position or speed data of the motors, respectively, in order to control the inverters 4-1, . . . , 4-*k*, respectively.

Then, the inverter control devices 8-1, . . . , 8-*k* generate the PWM signals $V_{PWM1}, \ldots, V_{PWMk}$ to drive the motors 5-1, . . . , 5-*k*, respectively, based on the sampled current value data and position or speed data of the motors, and position or speed command data of the motors from an upper control device, not shown schematically for simplification.

Further, the inverter control devices 8-1, . . . , 8-*k* transmit response data to call data, described later, to the converter control device 9, respectively, via the serial communication bus 10.

The current detection units 4*u*-1; 4*v*-1; 4*w*-1, . . . , 4*u*-*k*; 4*v*-*k*; 4*w*-*k* consist of, for example, hole elements, respectively, and the upper control device, not shown schematically, consists of, for example, a CNC (computer numerical control).

In the system shown in FIG. 1, the upper control device, not shown schematically, outputs an alternating-current power source regeneration command signal to the converter control device 9 in order to carry out alternating-current power source regeneration to return regenerative energy generated during speed reduction of the motors 5-1, . . . , 5-*k* to the three-phase alternating-current power source 1 side.

In this case, the upper control device, not shown schematically, outputs the position or speed command data corresponding to a PWM signal $V_{PWM}$ to the inverter control devices 8-1, . . . , 8-*k*, respectively, in order for the inverter control devices 8-1, . . . , 8-*k* to control the turning on and off of the transistors of the inverters 4-1, . . . , 4-*k* by outputting the PWM signals $V_{PWM1}, \ldots, V_{PWMk}$ to the inverters 4-1, . . . , 4-*k*, respectively.

The converter control device 9 generates a PWM signal $V_{PWM}'$ based on the alternating-current power source regeneration command signal and outputs the PWM signal $V_{PWM}'$ to the converter 2 in order to carry out alternating-current power source regeneration. Further, in the system shown in FIG. 1, reactors 1*u*, 1*v*, and 1*w* are arranged between the three-phase alternating-current power source 1 and the converter 2 in order to carry out alternating-current power source regeneration.

The converter control device 9 has a CPU 9*a*, a ROM 9*b*, a RAM 9*c*, a clock signal generation unit 9*d*, and a serial communication unit 9*e*. The CPU 9*a* executes programs to carry out various kinds of operation. The ROM 9*b* stores the programs and various kinds of data relating to the performance, etc., of the converter control device 9. The RAM 9*c* temporarily stores data of the result of calculation by the CPU 9*a*, data such as motor status information, which is transmitted from the inverter control devices 8-1, . . . , 8-*k* via the serial communication bus 10, and data from the upper control device, not shown schematically.

The clock signal generation unit 9*d* generates a first serial clock signal, which corresponds to the first communication speed f1, and outputs the generated first serial clock signal to the CPU 9*a* and the serial communication unit 9*e*. To do this, the clock signal generation unit 9*d* consists of an oscillation element, an oscillation circuit, a baud rate setting register, a baud rate generator, etc.

In the system shown in FIG. 1, the clock signal generation unit 9*d* has a communication speed change determination unit 9*d'* configured to change the data communication speed from the first communication speed f1 to a second communication speed f2 (for example, 125 kHz) lower than the first communication speed f1, in response to the communication speed change notification data from the serial communication unit 9*e*. To do this, the communication speed change determination unit 9*d'* divides the first serial clock signal in response to the communication speed change notification data from the serial communication unit 9*e*, generates a second serial clock signal, which corresponds to the second communication speed f2 (for example, 125 kHz), and outputs the generated second serial clock signal to the CPU 9*a*.

In the system shown in FIG. 1, power is supplied from a power source, not shown schematically, to the converter control device 9, the converter control device 9 enters the activated state at the same time as the supply of power from the power source, not shown schematically, is started, and the converter control device 9 stops the operation thereof at the same time as the supply of power from the power source, not shown schematically, is stopped. Further, in the system shown in FIG. 1, the drive of the motors 5-1, . . . , 5-*k* is started after the preparation to drive the motors 5-1, . . . , 5-*k* is completed, and the drive of the motors 5-1, . . . , 5-*k* is stopped based on the command from an upper control device, not shown schematically. Whether or not the preparation to drive the motors 5-1, . . . , 5-*k* is completed is determined by the CPU 9*a*, which determines that transmission and reception of all the data necessary to drive the motors 5-1, . . . , 5-*k* between the converter control device 9 and the inverter control devices 8-1, . . . , 8-*k* via the serial communication bus 10 are completed, for example.

The serial communication unit 9*e* carries out serial communication between the converter control device 9 and the inverter control devices 8-1, . . . , 8-*k* via the serial communication bus 10. To do this, the serial communication unit 9*e* has a data transmission unit 9*e*-1, a data reception unit 9*e*-2, a band variable filter 9*e*-3, and a serial communication control unit 9*e*-4.

The data transmission unit 9*e*-1 transmits data such as the alarm information, etc., to the inverter control devices 8-1, . . . , 8-*k* via the serial communication bus 10. The data reception unit 9*e*-2 receives data such as the motor status information, etc., from the inverter control devices 8-1, . . . , 8-*k* via the serial communication bus 10 and the band variable filter 9*e*-3. The band variable filter 9*e*-3 has a first bandwidth and filters the data received from the inverter control devices 8-1, . . . , 8-*k* via the serial communication bus 10.

The serial communication control unit 9*e*-4 makes a call to the inverter control devices 8-1, . . . , 8-*k* by the data transmission unit 9*e*-1, receives a response to the call by the data reception unit 9*e*-2, notifies the change of communication speed by the data transmission unit 9*e*-1, and makes a change to the band variable filter 9*e*-3. To do this, the serial communication control unit 9*e*-4 has a call unit 9*e*-4-1, a response reception unit 9*e*-4-2, a change notification unit 9*e*-4-3, and a bandwidth change unit 9*e*-4-4.

After the converter control device 9 is activated, the call unit 9*e*-4-1 transmits a signal to transmit call data to verify the presence or absence of the inverter control devices, which correspond to the motors, (hereinafter, referred to as a "call signal") to all the salve devices, which correspond to all the motors connected to the smoothing capacitor 3, that is, to the inverter control devices 8-1, . . . , 8-*k*, respectively, via the data transmission unit 9*e*-1, in order to determine the number of inverter control devices, which correspond to the motors connected to the smoothing capacitor 3, by the response reception unit 9*e*-4-2.

The response reception unit 9*e*-4-2 receives a signal to transmit response data to the call signal (hereinafter, referred to as a "response signal") from the inverter control devices 8-1, . . . , 8-*k*, respectively, via the data reception unit 9*e*-2 during the period from the time when the call signal is transmitted to the time when the drive of the motors 5-1, . . . , 5-*k* is started. Then, the response reception unit 9*e*-4-2 determines that the number of all the inverter control devices 8-1, . . . , 8-*k*, which correspond to all the motors connected to the smoothing capacitor 3, is k as the third number equal to or less than n, based on the number of the received response signals.

The change notification unit 9*e*-4-3 determines whether or not the measured number k is equal to or less than a number N as the fourth number, which is less than the above-mentioned maximum number n and equal to or more than one. If the number k, which is the number of the inverter control devices 8-1, . . . , 8-*k*, is equal to or less than the number N, the change notification unit 9*e*-4-3 notifies communication speed change notification data to the effect that the data communication speed is changed from the first communication speed f1 to the second communication speed f2 to the inverter control devices 8-1, . . . , 8-*k*, respectively, via the data transmission unit 9*e*-1 and the serial communication bus 10, and notifies the communication speed change notification data to the bandwidth change unit 9*e*-4-4. The inverter control devices 8-1, . . . , 8-*k* change the flock frequency of the clock signal generated by themselves from the clock frequency, which corresponds to the first communication speed, to the clock frequency, which corresponds to the second communication speed, in response to the communication speed change notification data from the change notification unit 9*e*-4-3. That is, the number N is predetermined as a threshold value used to determine whether or not the data communication speed should be changed from the first communication speed to the second communication speed. The change notification unit 9*e*-4-3 also notifies the communication speed change notification data to the communication speed change determination unit 9*d'*.

The bandwidth change unit 9*e*-4-4 outputs a bandwidth change command to change the bandwidth of the band variable filter 9*e*-3 from the first bandwidth to the second bandwidth narrower than the first bandwidth to the band variable filter 9*e*-3, in response to the communication speed change notification data from the change notification unit 9*e*-4-3. Consequently, the band variable filter 9*e*-3 changes the bandwidth from the first bandwidth to the second bandwidth, in response to the bandwidth change command from the bandwidth change unit 9*e*-4-4.

Figure 2:
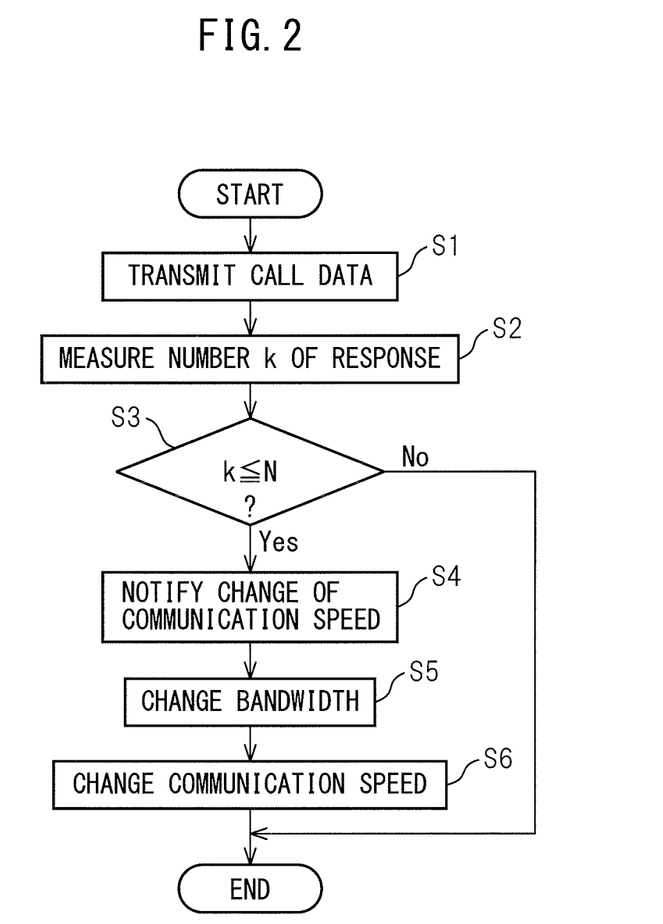
FIG. 2 is a flowchart of an operation of a converter control device in FIG. 1.

FIG. 2 is a flowchart of the operation of the converter control device in FIG. 1, which is started immediately after the converter control device 9 is activated.

First, the call unit 9*e*-4-1 transmits the call signal to all the slave devices, which correspond to all the motors connected to the DC link part (step S1). Next, the response reception unit 9*e*-4-2 receives the response signal to the call signal from each of the inverter control devices 8-1, . . . , 8-*k*, measures the number k of received response signals, and determines that the measured number k is the number of motors (step S2).

Next, the change notification unit 9*e*-4-3 determines whether or not the measured number k is equal to or less than the number N (step S3). If the number k of pieces of received response data is not equal to or less than the number N, i.e., if the number k of pieces of received response data exceeds the number N or is zero, the processing flow is exited. In contrast to that, if the number k of pieces of received response data is equal to or less than the number N, the change notification unit 9*e*-4-3 notifies the communication speed change notification data to each of the inverter control devices 8-1, . . . , 8-*k*, the communication speed change determination unit 9*d'*, and the bandwidth change unit 9*e*-4-4 (step S4).

Next, the bandwidth change unit 9*e*-4-4 changes the bandwidth of the band variable filter 9*e*-3 from the first bandwidth to the second bandwidth, in response to the communication speed change notification data (step S5). Next, the communication speed change determination unit 9*d'* generates the second serial clock signal in response to the communication speed change notification data in order to change the data communication speed from the first communication speed to the second communication speed (step S6), and exits the processing.

According to the above-mentioned embodiment, if the number of all the motors connected to the smoothing capacitor 3, i.e., the number of the motors 5-1, . . . , 5-*k* is equal to or less than N, the communication speed change determination unit 9*d'* changes the data communication speed of data transmitted and received between the converter control device 9 and the inverter control devices 8-1, . . . , 8-*k* from the first communication speed to the second communication speed during the period from the time when the number k is determined to the time when the drive of the motors 5-1, . . . , 5-*k* is stopped. Due to this, the cost necessary to take measures against noise received in serial communication in order to carry out transmission and reception of data between the converter control device 9 and the inverter control devices 8-1, . . . , 8-*k* via the serial communication bus 10, and restrictions on the length of the cable used for the serial communication no longer increase more than necessary.

In the system shown in FIG. 1, the case where the first communication speed f1 is set so that the data transmission and reception period can be kept at a fixed time (for example, 1 msec) or less even if the number n of the inverter control devices, i.e., the maximum number of the inverter control devices that can be used, are used, and the data communication speed is changed from the first communication speed to the second communication speed lower than the first communication speed if the number k of pieces of received response data is equal to or less than the number N, is explained.

However, in the system shown in FIG. 1, it is also possible to suppose that the number of the inverter control devices actually used is k, which is the maximum number of devices that can be used, less than n, to set the first communication speed f1, which is set so that the data transmission and reception period can be kept at a fixed time (for example, 1 msec) or less if the number k of inverter control devices are used, and to change the data communication speed from the first communication speed to the second communication speed higher than the first communication speed if the number k of pieces of received response data is equal to or more than N.

In this case, even if it is not possible to keep the data transmission and reception period at a fixed time or less when the number of inverter control devices actually used is larger than N and the data communication speed is the first communication speed f1, it is possible to keep the data transmission and reception period at a fixed time or less by changing the data communication speed from the first communication speed to the second communication speed higher than the first communication speed.

Consequently, the communication speed change determination unit $9d'$ determines whether or not the communication speed of data transmitted and received between the converter control device 9 and the inverter control devices 8-1, . . . , 8-$k$ should be changed from the first speed to the second speed different from the first speed during the period from the time when the number k is determined to the time when the drive of the motors 5-1, . . . , 5-$k$ is stopped, in accordance with the result of comparison between the number k of the inverter control devices 8-1, . . . , 8-$k$ and the number N.

Figure 3:
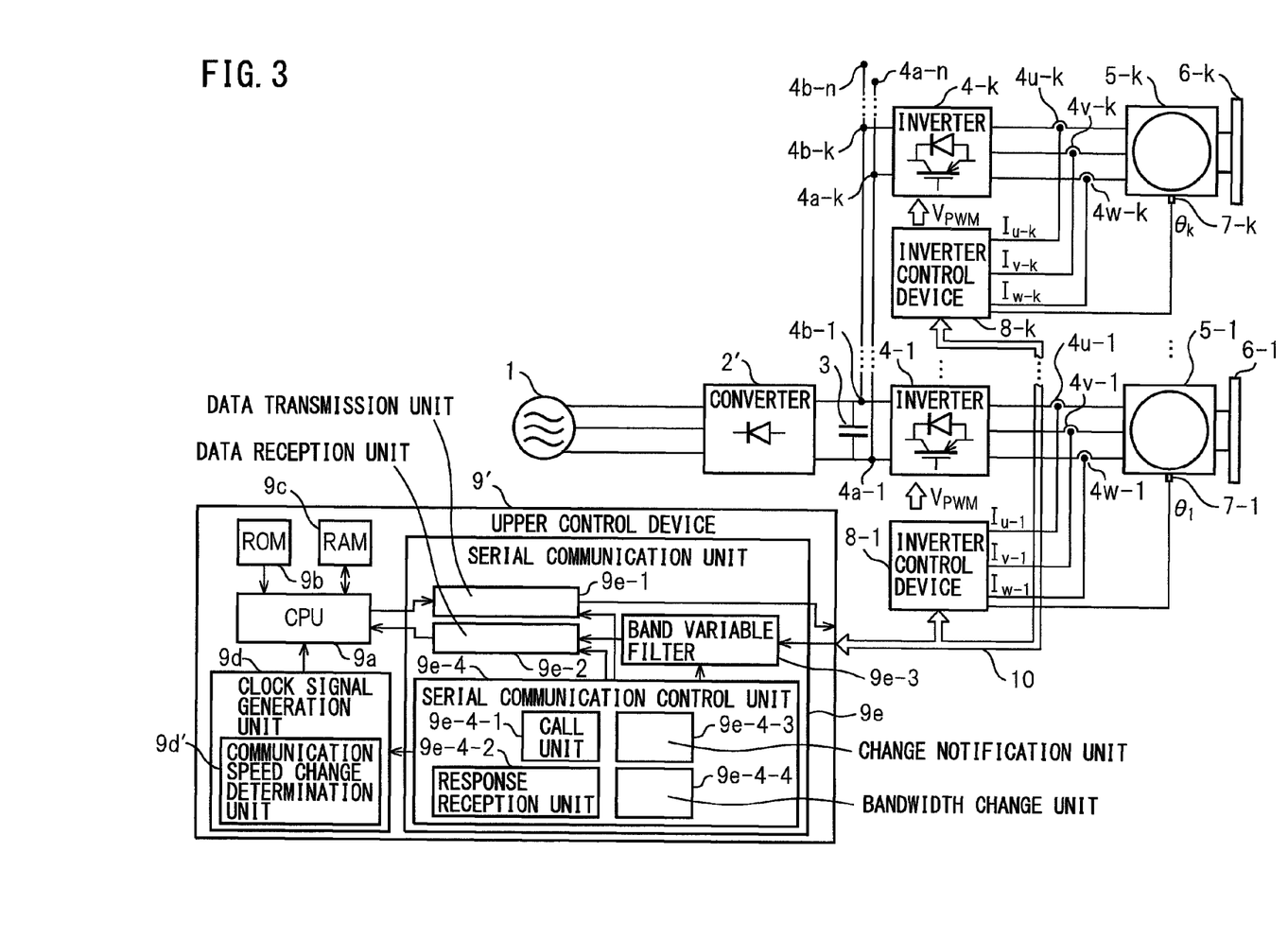
FIG. 3 is a block diagram of another system to which the master device according to the present invention is applied in order control motors.

FIG. 3 is a block diagram of another system to which the master device according to the present invention is applied in order to control motors. In the system shown in FIG. 3, an upper control device 9' is used as the master device in place of the converter control device 9 and a converter 2' is arranged between the three-phase alternating-current power source 1 and the smoothing capacitor 3 in place of the reactors 1$u$, 1$v$, and 1$w$, and the converter 2 in FIG. 1.

The upper control device 9' has the CPU 9$a$, the ROM 9$b$, the RAM 9$c$, the clock signal generation unit 9$d$, and the serial communication unit 9$e$ in FIG. 1. Further, the upper control device 9' transmits data such as motor position or speed command data, etc., to the inverter control devices 8-1, . . . , 8-$k$ via the serial communication bus 10 and receives data such as current value data, the motor position or speed data, etc., from the inverter control devices 8-1, . . . , 8-$k$ via the serial communication bus 10.

The present invention is not limited to the above-mentioned embodiments and there can be a variety of modifications and different shapes. For example, it is possible to use the master device according to the present invention in a machine other than a machine tool, an industrial robot, etc. Further, it is possible to implement the master device by a device other than the converter control device 9 and the upper control device 9', and to implement the slave device by a device other than the inverter control devices 8-1, . . . , 8-$k$. Further, it is also possible to use $I^2C$ communication, etc., as the serial communication.

In the above-mentioned embodiments, as an alternating-current power source, the three-phase alternating-current power source 1 is used, however, it is also possible to use a multi-phase alternating-current power source other than the three-phase alternating-current power source as an alternating-current power source. Further, it is possible to constitute the rotation angle detection units 7-1, . . . , 7-$k$ by a part (for example, hole element or resolver) other than the rotary encoder. Further, it may also be possible to detect only two phases of currents (for example, U-phase current and V-phase current) of the U-phase current, the V-phase current, and the W-phase current instead of detecting all of the U-phase current, the V-phase current, and the W-phase current.

In the above-mentioned embodiments, the case where the number k of inverter control devices 8-1, . . . , 8-$k$ correspond to the number k of motors 5-1, . . . , 5-$k$, respectively, that is, one motor is controlled by one inverter control device, is explained. However, it is also possible to control the number k of motors 5-1, . . . , 5-$k$ by the number i less than k and equal to or more than one of inverter control device(s), i.e., to control two or more motors by one inverter control device (multi-axis inverter control device). In this case, it is preferable to arrange the inverter control devices 8-1, . . . , 8-$i$ so that the length of the serial communication bus 10 interposed between the converter control device 9 and the inverter control device 8-$i$ most distant from the converter control device 9 will be the minimum, however, it is not necessary to arrange the inverter control devices 8-1, . . . , 8-$i$ so that the length of the serial communication bus 10 will be the minimum.

Further, it is also possible to apply the present invention to the case where each of a plurality of sets of winding incorporated in one motor is controlled by one inverter control device. For example, in the case where four sets of winding are incorporated in one motor, each winding is controlled by one inverter control device, and therefore, four inverter control devices are used for one motor. Consequently, it is possible to control the number k of motors 5-1, . . . , 5-$k$ by the number j, which exceeds k, of inverter control devices, that is, to control one motor by two or more inverter control devices. In this case, it is preferable to arrange the inverter control devices 8-1, . . . , 8-$j$ so that the length of the serial communication bus 10 interposed between the converter control device 9 and the inverter control device 8-$j$ most distant from the converter control device 9 will be the minimum, however, it is not necessary to arrange the inverter control devices 8-1, . . . , 8-$j$ so that the length of the serial communication bus 10 will be the minimum.

In the case where the number k of inverter control devices 8-1, . . . , 8-$k$ correspond to the number k of motors 5-1, . . . , 5-$k$, respectively, the second number, which is the number of slave devices, will be the same number as the first number, which is the number of motors. In the case where the number i less than k and equal to or more than one of inverter control devices 8-1, . . . , 8-$i$ correspond to the number k of motors 5-1, . . . , 5-$k$, the second number, which is the number of slaves, will be a number less than the first number, which is the number of motors. Further, in the case where the number j, which exceeds k, of inverter control devices 8-1, . . . , 8-$j$ correspond to the k motors 5-1, . . . , 5-$k$, the second number, which is the number of slaves, will be a number exceeding the first number, which is the number of motors. Consequently, the second number, which is the number of slave devices, will be the same number as the first number, which is the number of motors, or will be a number different from the first number, which is the number of motors.

Furthermore, in the above-mentioned embodiments, the case where the band variable filter 9$e$-3 is provided in the converter control device 9 and the upper control device 9' is explained, however, it is also possible to provide the band variable filter 9$e$-3 in the inverter control devices 8-1, . . . , 8-$k$.

As above, the present invention is explained in relation to the preferred embodiments thereof, however, it should be understood by a person skilled in the art that various alterations and modifications can be made without deviating from the scope disclosed by the claims.

The invention claimed is:

1. A master device capable of connecting to slave devices, which correspond to a first number not less than two of motors, via a serial communication bus for carrying out data transmission and reception at a first communication speed, in order to control a system in which a first number not less than two of motors in the same number as the number of inverters can be connected in parallel to a DC link part, which is connected to an alternating-current power source via a converter, via each the first number of the inverters, the number of the slave devices being a second number, the master device comprising: a call circuit configured to transmit a call signal to verify the presence or absence of the slave devices, which correspond to the motors, to all the slave devices, which correspond to all the motors connected to the DC link part, after the master device is activated;

a response reception circuit configured to receive a response signal to the call signal from each of all the slave devices, which correspond to all the motors connected to the DC link part, and to determine a third number which is the number of all the slave devices, which correspond to all the motors connected to the DC link part, based on the number of received response signals; and  a communication speed change determination circuit configured to determine whether or not a data communication speed of data transmitted and received between the master device and the third number of slave devices should be changed from the first communication speed to a second communication speed different from the first communication speed during a period from the time when the third number is determined to the time when the drive of the motors is stopped, in accordance with a result of comparison of between the third number and a fourth number less than the second number and equal to or more than one, the fourth number being previously set as a threshold value for determining whether or not the data communication speed should be changed from the first communication speed to the second communication speed.

2. The master device according to claim 1, further comprising a change notification unit configured to notify the change of the data communication speed from the first communication speed to the second communication speed to the third number of the slave devices, wherein  the second communication speed is lower than the first communication speed, and  the communication speed change determination circuit changes the data communication speed of the data transmitted and received between the master device and the third number of slave devices from the first communication speed to the second communication speed during a period from the time when the third number is determined to the time when the drive of the motors is stopped if the third number is equal to or less than the fourth number.

3. The master device according to claim 2, further comprising a bandwidth change circuit configured to change a bandwidth of a band variable filter provided in at least one of the master device and the third number of the slave devices from a first bandwidth to a second bandwidth narrower than the first bandwidth, in accordance with the change of the data communication speed from the first communication speed to the second communication speed, in order to remove noise received in the serial communication.

4. The master device according to claim 1, further comprising a change notification unit configured to notify the change of the data communication speed from the first communication speed to the second communication speed to the third number of the slave devices, wherein  the second communication speed is higher than the first communication speed, and  the communication speed change determination circuit changes the data communication speed of data transmitted and received between the master device and the third number of the slave devices from the first communication speed to the second communication speed during a period from the time when the third number is determined to the time when the drive of the motors is stopped if the third number is larger than the fourth number.

5. The master device according to claim 4, further comprising a bandwidth change circuit configured to change a bandwidth of a band variable filter provided in at least one of the master device and the third number of the slave devices from a first bandwidth to a second bandwidth narrower than the first bandwidth, in accordance with the change of the data communication speed from the first communication speed to the second communication speed, in order to remove noise received in the serial communication.

\* \* \* \* \*